United States Patent [19]

Schaar

[11] 4,036,094
[45] July 19, 1977

[54] SHEARING DEVICE FOR STRANDS OF PLASTIC MATERIAL

[75] Inventor: Lothar Schaar, Heuerssen, Germany

[73] Assignee: Hermann Heye, Obernkirchen, Germany

[21] Appl. No.: 670,172

[22] Filed: Mar. 24, 1976

[30] Foreign Application Priority Data

Apr. 17, 1975 Germany .............................. 2516854

[51] Int. Cl.² ............................................. B26D 5/08
[52] U.S. Cl. ................................................. 83/623
[58] Field of Search .................................. 83/623, 600

[56] References Cited

U.S. PATENT DOCUMENTS 3,490,326  1/1970  McNamara ............................. 83/600
3,817,133  6/1974  Romberg ................................ 83/600

Primary Examiner—Travis S. McGehee
Attorney, Agent, or Firm—Michael J. Striker

[57] ABSTRACT

A device for shearing gobs from at least one strand of material in plastic condition, for instance molten glass, comprises two blades movable toward and away from each other, one of which is tiltable about its longitudinal axis, and the other about an axis transverse to its longitudinal axis.

22 Claims, 17 Drawing Figures

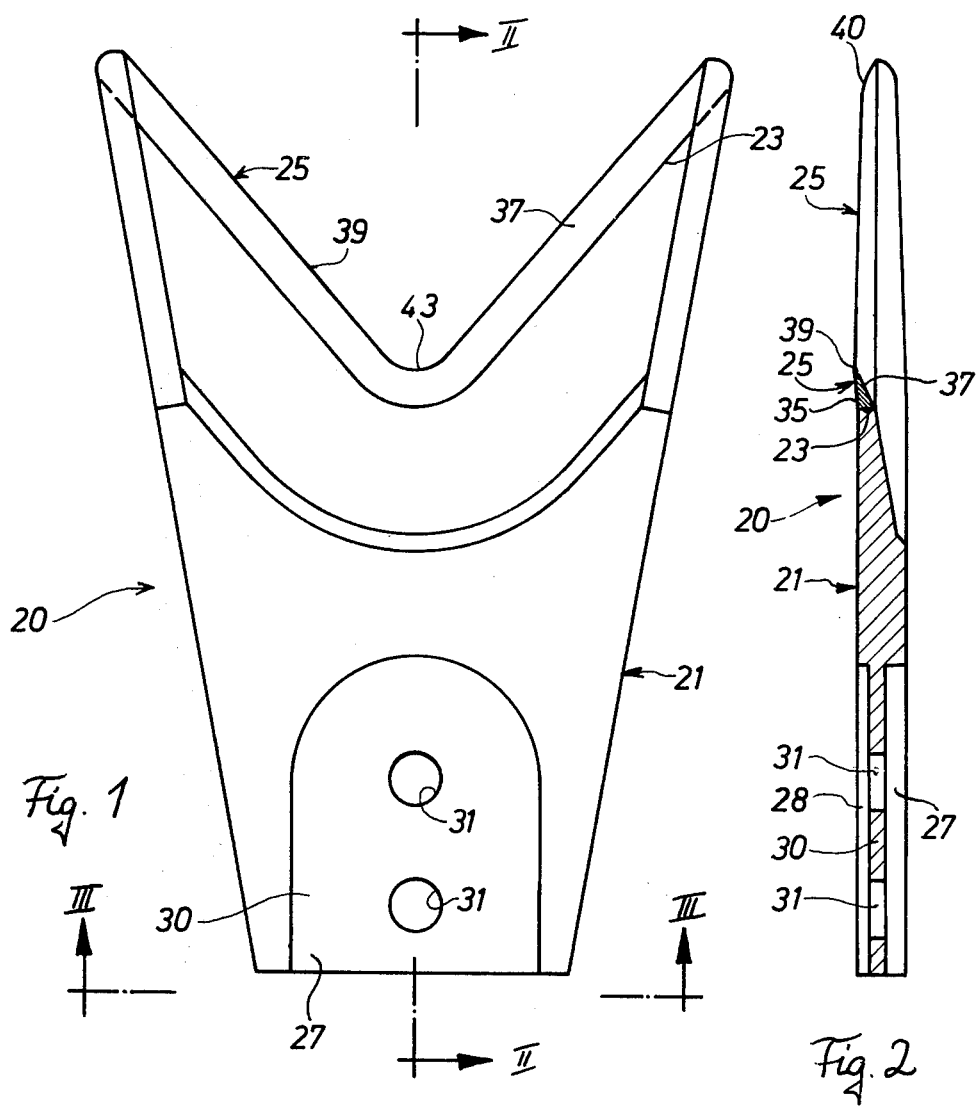

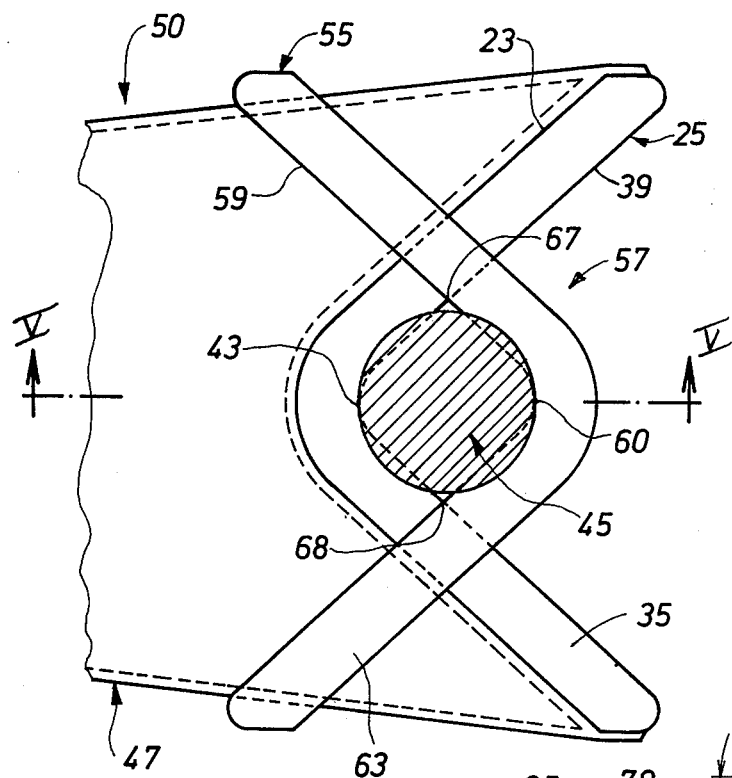
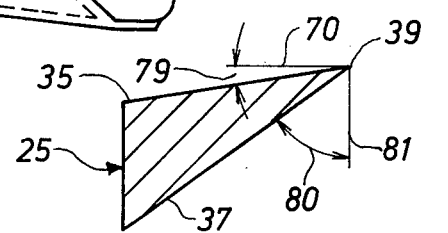
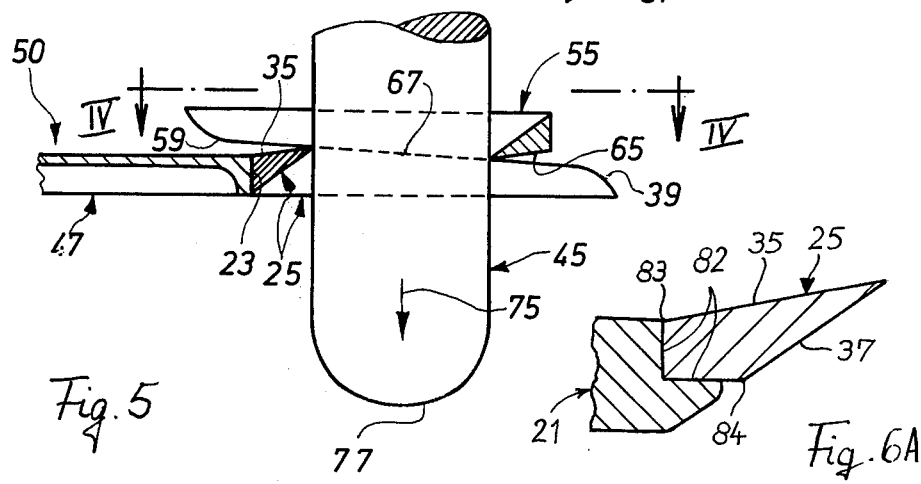

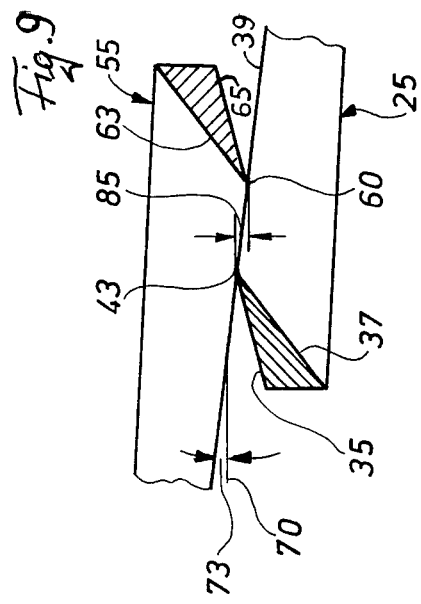
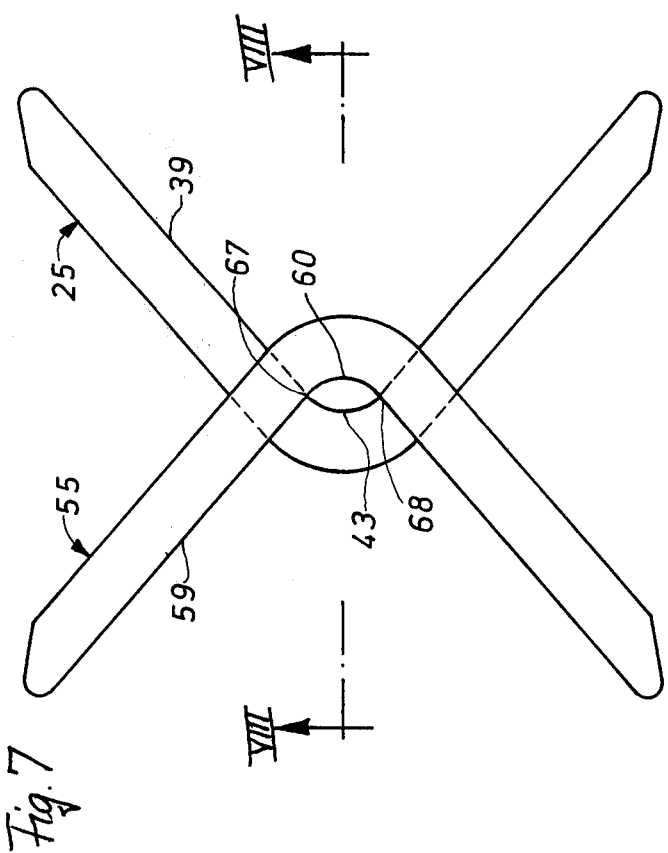
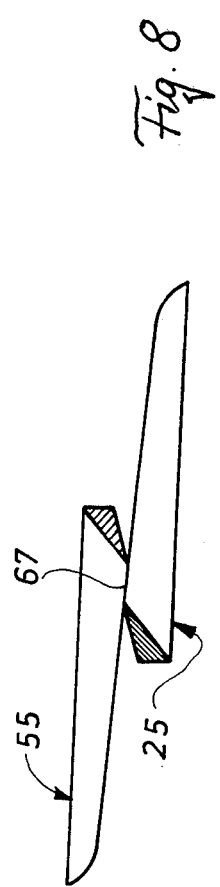

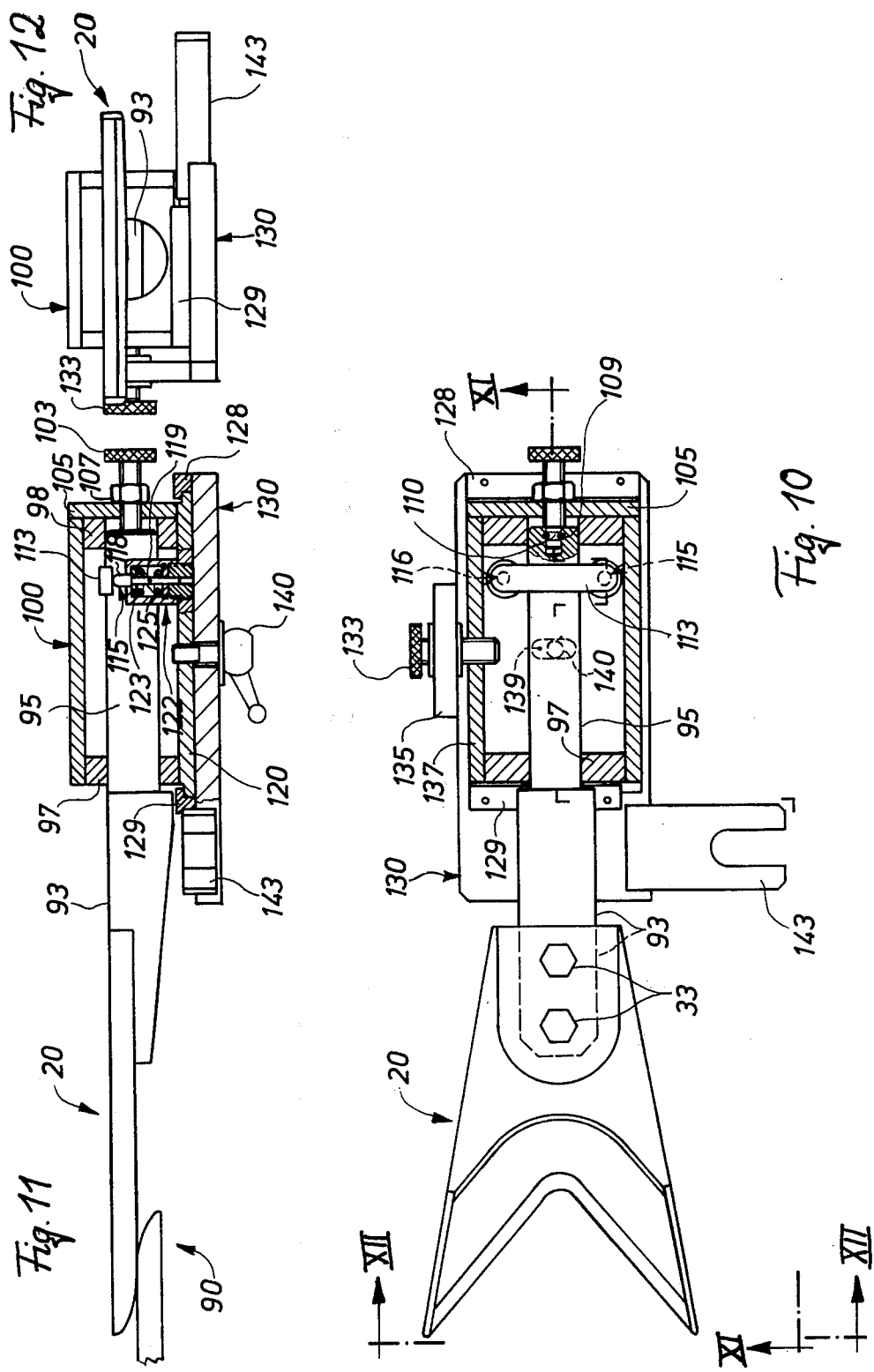

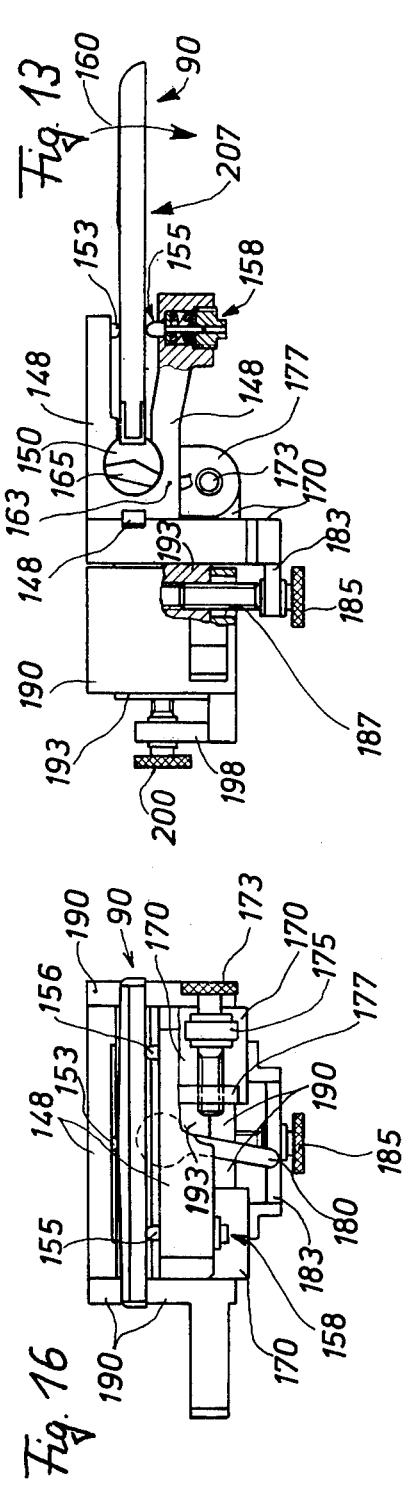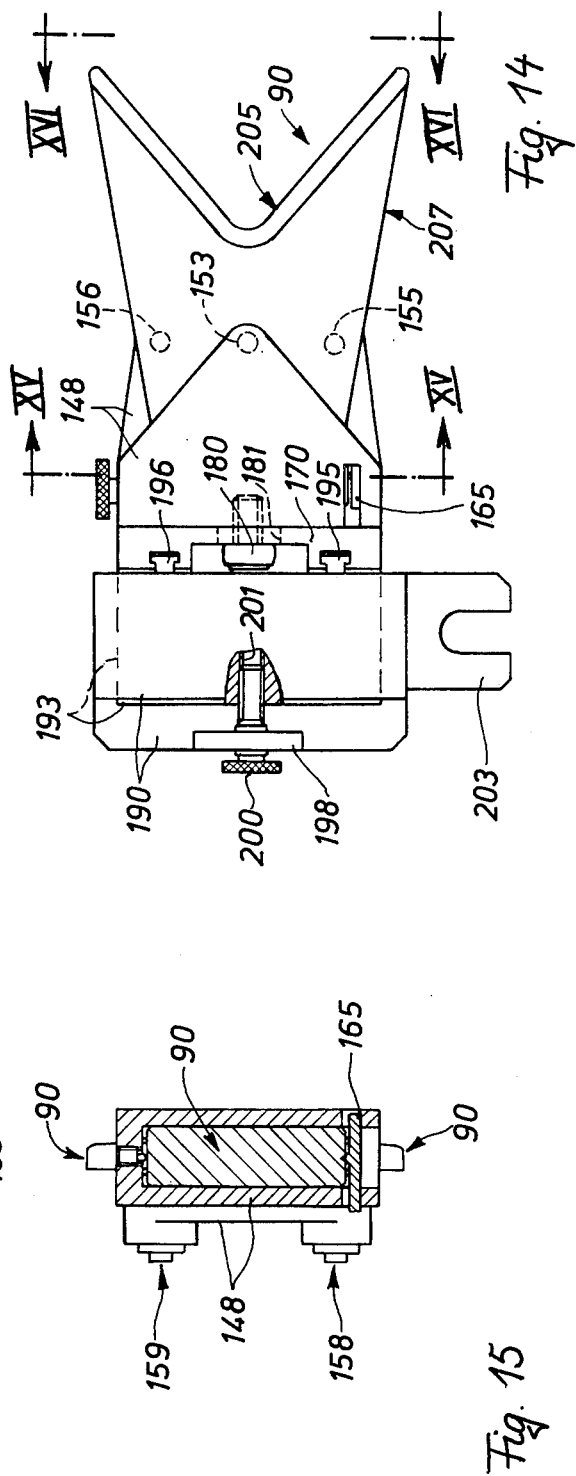

SHEARING DEVICE FOR STRANDS OF PLASTIC MATERIAL

BACKGROUND OF THE INVENTION

The present invention relates to a device for shearing gobs from one or a plurality of strands of material in plastic condition, for instance molten glass, in which the shearing of each gob is accomplished by two cooperating shear blades movable toward and away from each other.

In a known device of this kind (DT-OS 2,304,009) each cutting blade consists of a relatively thin light and resilient blade body made from high speed steel in which the total surface of the blade with the exception of the ground cutting edge and a zone bordering thereon is covered with a layer of material having a high heat conductivity. This layer of material is relatively thin and consists for instance of an electrolytically applied silver layer. In addition, a cooling tube of copper is connected at least at one side of the shear blade with the aforementioned material layer in a heat conductive manner. Cooling water is circulated through this cooling tube.

The disadvantages of this construction are that the heat from the glass strand is transferred into the cutting edge and the bordering zone of the high speed steel, which has a relatively small heat conductivity and likewise a very small heat conducting cross-section. The very thin cutting edge is, due to its geometric form, subjected to the full heat load. Thereby, the combination of low heat storing capacity due to the small mass of the blade at the zone bordering the cutting edge, and the small heat conductivity of the high speed steel is especially disadvantageous.

Furthermore, the cutting edge and a relatively large zone of the blade bordering the cutting edge come in contact and therewith in heat exchange with the hot glass strand. An undue high temperature at the cutting edge and therefore a limitation of use of the known device will result at high cutting frequencies since the better heat conducting material layers, which are spaced from the cutting edge, can also, due to their small thickness, only absorb relatively small amounts of heat per time unit to conduct such heat to the water cooling tubes, which are necessary in the known device. Therefore, high temperature gradients will necessarily form in the shear blade. Since, on the other hand, for technological reasons a maximum temperature of the cutting edge of about 620° C is not to be surpassed in order to avoid sticking of glass to the cutting edge, the use of the known device, despite the necessary cooling tubes to be connected thereto, has only limited application. With the known device it is especially not possible to produce relatively heavy gobs with sufficient cutting frequencies, which gobs are often required in the industry for making hollow glass articles.

SUMMARY OF THE INVENTION

It is an object of the present invention to provide a shearing device which avoids the disadvantages of shearing devices known in the art.

It is a further object of the present invention to provide a shearing device in which the heat load and the temperature occurring at the cutting edge of each shear blade is held with simple means within optimal limits and to avoid additional cooling and lubricating as far as possible.

With these and other objects in view, which will become apparent as the description proceeds, the device for shearing gobs from at least one strand of material in plastic condition, such as molten glass, mainly comprises two cooperating shear blades movable toward and away from each other, in which each shear blade comprises a frame, a cutting element fixedly connected to the frame and formed from material having a high heat penetration coefficient, high wear resistance and great heat conductivity, in which each of the cutting elements has a cutting edge, a clearance face facing the other blade and including with a horizontal plane a clearing angle, which, starting from the cutting edge of one cutting element, extends away from the other blade, and in which each of the cutting elements has, at a side opposite the aforementioned clearance face, a pressure face including with a vertical plane a pressure angle which, starting from the cutting edge of one cutting element, extends away from the other shear blade.

The heat penetration coefficient is determined by $$\sqrt{\lambda \cdot c_p \cdot \rho} \, [kcal/m^2 \cdot °C \cdot h^{1/2}]$$

$\lambda$ is the heat conductive capacity or heat conducting coefficient in $kcal/m.h.°C$, $c_p$ is the specific heat capacity in $kcal/kg.°C$ and, $\rho$ the density in $kg/m^3$ of the used material. The heat penetration coefficient determines during the non-stationary process of heating a body the size of the penetrating heat flow. The high wear resistance of the cutting element will assure a perfect cutting edge during extended use so that a deformation of the cutting edges, even at point contact of the letter, will not occur.

The cutting elements are preferably V-shaped with the legs of the V facing each other. The clearance angle will hold the clearance face of the cutting element away from the hot glass strand and thus prevents, by the air gap maintained between the glass and the cutting element, any substantial penetration of heat into the cutting element at the clearance face. The clearance angle also contributes to an unequivocal and defined contact of the two cutting edges with each other. The size of the clearance angle can, for all practical purposes, be chosen of a sufficient size since the speed of the glass strand, at the cutting moment can be influenced in known manner in any desired way, for instance through a plunger reciprocably arranged in a glass feeder. On the other hand, at constant flow speed of the glass strand, it is possible, in a manner known per se, to move the cutting blades in the direction of the movement of the strand, so that relative movement between glass strand and cutting blades is likewise reduced. In all cases it is therefore possible to maintain the clearance face, or at least a large part thereof, free of glass during the cutting.

The pressure angle permits a minimum of deformation of the gob and a minimum of heat load on the cutting element. Due to the fact that the cutting element has a relatively great mass, the maximum temperature occurring at the cutting edge will be maintained small. Since the cross-section of the cutting element increases in the direction of heat flow and away from the cutting edge thereof, the heat energy transmitted to the region of the cutting edge will be transported in a perfect manner away from the latter and a perfect distribution and storage of this energy will occur in the cutting element. Thereby, the cutting edge can be positively held at an optimum temperature of about 300° C which will assure the best cutting of a gob from the strands of glass.

Due to the relatively great mass of the cutting elements, which can receive and store heat energy, it is in many cases not even necessary that the frame will be used to conduct heat away from the cutting element. The frame can therefore also be formed in a conventional manner of relatively thin resilient material, for instance high speed steel. On the other hand, it is also possible to construct the frame integral with the cutting element.

The clearance angle may be between 0° to 5°, preferably between 2° and 5°.

The pressure angle may be between 0° and 70°, preferably between 30° and 70°.

The cutting element is formed according to one embodiment of the present invention from hard metal. Suitable hard metal types are for instance the hard metals CT60 and CS35 produced by Sandvik Stahl GmbH, Dusseldorf, Heerdter Landstrasse 229-233. These hard metals have a heat penetration coefficient of 258, respectively 259 kcal/m$^2$.°C.h$^{1/2}$ and a heat conductivity of 98.9, respectively 103.2 kcal/m.h.°C.

According to a further feature of the present invention, the cutting edge of at least one cutting element extends, starting from its end cutting point, at a guide angle with respect to a horizontal plane away from the cutting edge of the other cutting element. This guide angle will assure that the two cooperating cutting edges of the two cutting blades will engage each other only at most at two points. This will further assure a clear cutting of the gob and that the upper cutting element will move up on the lower, and the lower cutting element will move down on the upper one. The thereby resulting vertical movement of the cutting elements is rendered possible by means of a resilient frame or by other means according to the present invention which will be described later on.

The guide angle may be chosen between the 0° and 2° and preferably between 0.2 and 2°.

The cutting element of preferably triangular cross-section can be produced and connected to the frame in a simple manner. The face of the cutting element opposite the cutting edge and connecting the clearance face and the pressure face with each other can also be profiled. Such profiling may be of triangular or semi-circular outline or be in the form of serrations. Such profiling serves to increase the heat-exchange surface between cutting element and frame and therewith will facilitate the heat transfer in the case in which the heat penetration coefficient and the heat conductivity of a soldering layer between the cutting element and the frame is small, as compared to the corresponding characteristics of the cutting edge and the frame. Such a profile will also assure together with a complementary profile of the frame positive and thus improved mechanical connection of the cutting element with the frame and avoidance of shear stresses on the soldering layer.

According to another embodiment of the present invention, at least the portion of the frame bordering the cutting element consists of material with a high heat penetration coefficient and high heat conductivity. Beryllium bronze CuBe 1.7 (1.7 % beryllium and the remainder copper) can for instance be used in this case. The heat penetration coefficient of this material is 292 kcal/m$^2$. °C.h$^{1/2}$ and the heat conductivity is 108 kcal/m.h. °C. Instead of beryllium bronze, pure copper may also be used which has a heat penetration coefficient of 522 kcal/H m$^2$.°C.h$^{1/2}$ and a heat conductivity of 330 kcal/H m.h.°C.

According to a further feature of the present invention, the cutting element and the frame are connected by a layer of solder having a high heat penetration coefficient and good heat conductivity. If the solder has a relatively low heat penetration coefficient and/or heat conductivity, then the layer of solder should be held as thin as possible, in order to avoid a heat barrier. The layer of solder can for instance be a hard silver solder of the type Castolin 181, produced by the company Castolin GmbH in 6239 Krestel, Postfach 1120, which has a heat penetration coefficient of about 187 kcal/m$^2$.°C.h$^{1/2}$ and a heat conductivity of 72 kcal/m.h.°C or such solder may be of silver with a heat penetration coefficient 495 kcal/m$^2$.°C.h$^{1/2}$, and a heat conductivity of 360 kcal/m.h.°C. When either of the aforementioned solder materials is used, the heat energy can practically flow unrestrained from the cutting element into the frame to be distributed in the latter and be transferred to the surrounding atmosphere.

According to a further feature of the present invention the thickness of the carrying frame is at least equal to the maximum thickness of the cutting element and the carrying frame is formed from material having a high heat penetration coefficient and a good heat conductivity. The thickness of the frame may for instance be 3 to 10 mm. Such a frame can be considered practically rigid. The frame may be provided on its outer surface with cooling ribs or cooling projections so as to enlarge the surface of the frame. At extremely high heat load of the shear blades, the latter may also be cooled by blowing cooling air thereagainst, or by liquid cooling means as disclosed in the aforementioned DT-OS No. 2,304,009, or simply by spraying a cooling liquid, for instance water, directly onto the shear blades. Experiments have shown that in all practical applications such an additional cooling of the blades is not necessary. The carrying frame may also in such a construction consist of beryllium bronze CuBe 1.7 or of pure copper. The material of the carrying frame is homogeneous so that an expensive layer construction as is necessary in the aforementioned DT-OS 2,304,009 can be avoided. Relatively thick carrying frames conduct, distribute and store heat energy in an excellent manner.

The avoidance of any additional cooling of the shear blades will entail small initial costs, simple installation and simple maintenance and this will also facilitate exchange of the shear blades. Since lubrication of the shear blades according to the present invention with usual lubrication emulsion is unnecessary, the working faces can be held clean and vapors of lubrication fluid or fouling of the workplace is avoided.

Heat is intermittently transmitted during each cut, into the cutting element. A high heat penetration coefficient thereof is therefore especially desirable. This may also be the case for the soldering layer according to the selected thickness and geometry of the latter. However, in the carrying frame there occurs, at increasing distance from the cutting edge, an at least substantially stationary heat conduction, so that a good heat conductivity is desirable for the frame. According to the invention it is therefore possible to select the material for the cutting element and/or the soldering layer and/or the carrying frame in such a manner to exclude weak spots in the chain of materials and so that the shear blade will properly withstand all loads it is subjected to.

According to a further feature of the present invention one of the shear blades is tiltable about its longitudinal axis and the other shear blade is tiltable about an axis at right angles to its longitudinal axis and parallel to its main plane. Thereby both shear blades may automatically adjust themselves to a common cutting plane. Exactly defined relatively small contact pressures will thus occur at the contact points of the cutting edges so that lubrication will be either completely unnecessary or may be limited to a very small extent.

According to a further feature of the invention, the one cutting blade is connected to a shaft arranged in a housing tiltably about its longitudinal axis and a yoke is connected to the shaft extending transverse and to opposite sides of the longitudinal axis of the latter, with each end of the yoke resiliently supported in the housing. Spring elements with an adjustable pre-tension may be used for this purpose which, during tilting of the shear blade about its longitudinal axis, will provide a predetermined resistance against such tilting.

In order to exactly adjust the position of the shear blade, the shaft may be axially shiftable and adjustably mounted in the housing. In addition, the housing may also be mounted on a shear blade holder adjustable in the direction transverse to the longitudinal axis of the shaft.

The other shear blade is, according to a further feature of the invention, connected to a shaft which is mounted tiltably about its longitudinal axis in a mounting member and be resiliently supported on the mounting member. In this construction the mounting member will be connected adjustably three dimensionally in three directions normal to each other with a shear blade holder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view of a first embodiment of a shear blade according to the invention;

FIG. 2 is a cross section taken along the line II—II of FIG. 1;

FIG. 3 is an end view, as viewed from the line III—III of FIG. 1;

FIG. 4 is a cross section taken along the line IV—IV of FIG. 5, in which the carrying frame is shown only for one of the cutting elements;

FIG. 5 is a cross-section according to the line V—V of FIG. 4;

FIG. 6 is a cross-section through the cutting element of FIG. 5 shown at an enlarged scale;

FIG. 6A is a cross section through another cutting element with a special connecting face;

FIG. 7 is a top view of the cutting elements according to FIGS. 4 and 5, illustrating the same during a further advance of the cutting operation;

FIG. 8 is a cross-section taken along the line VIII—VIII in FIG. 7;

FIG. 9 illustrates part of the cross-sections of the two cutting elements according to FIG. 8 at an enlarged scale;

FIG. 10 is a partially sectioned top view of a cutting blade tiltable about its longitudinal axis;

FIG. 11 is a cross-section taken along the line XI—XI of the embodiment shown in FIG. 10;

FIG. 12 is an end view of the embodiment shown in FIG. 10, as viewed from the line XII—XII in this Figure;

FIG. 13 is a partially sectioned side view of a cutting blade, which is tiltable about a horizontal axis transverse to the longitudinal axis of the blade and three dimensionally adjustable;

FIG. 14 is a partially sectioned top view of the arrangement shown in FIG. 13;

FIG. 15 is a cross-section taken along the line XV—XV of FIG. 14; and

FIG. 16 is a partially sectioned end view of the arrangement shown in FIG. 13 as viewed from the line XVI—XVI of FIG. 14.

DESCRIPTION OF THE PREFERRED EMBODIMENTS

FIG. 1 illustrates a shear blade 20 with a carrying frame 21 and with a V-shaped cutting element 25 connected to the carrying frame 21 by a soldering layer 23.

The carrying frame 21 is provided, in its region opposite to the cutting element 25 and on opposite faces thereof, with cutouts 27 and 28 to provide a mounting portion 30 in which bores 31 are formed for adjusting screws 33, shown in FIG. 10. The carrying frame 21 has a relatively large thickness and tapers in the direction toward the cutting element 25.

The cutting element 25 has, as shown in FIG. 2, a triangular cross-section, a clearance face 35, a pressure face 37 and a cutting edge 39. The cutting element 25 is provided at the ends of its legs with rounded engaging faces 40 which will prevent, in the event of improper adjustment of two cooperating shear blades, collision and destruction of the two shear blades. An end cutting point 43 located on the cutting edge 39, at the apex of the cutting element 25, which will sever the last fiber of the strand 45 of the molten glass, as shown in FIGS. 4 and 5.

In the embodiment as shown in FIGS. 1-3, the cutting element 25 is formed from hard metal, the soldering layer 23 from silver hard solder and the carrying frame from beryllium bronze.

The cutting element 25, as shown in FIG. 4, is of hard metal and connected by a soldering layer 23 with a carrying frame 47 of relatively thin, high speed steel to form a shear blade 50.

A further cutting element 55 of a shear blade 57, shown in FIG. 4 for simplification reasons without its carrying frame, cooperates with the cutting element 25. The cutting element 55 has a cutting edge 59 with an end cutting point 60, a pressure face 63 and a clearance face 65, shown for instance in FIG. 5.

In the position as shown in FIGS. 4 and 5, the cutting edges 39 and 59 have already partly penetrated into the strand 45 while the end cutting points 43 and 60 just touch the peripheral surface of this strand. The cutting elements 25 and 55 engage each other at their cutting edges 39 and 59, in the positions as shown in FIGS. 4 and 5, only at two points 67 and 68 and at the end of the cutting operation at the two end cutting points 43 and 60. The planes of the cutting edges 39 and 59 coincide as shown in FIG. 5 with each other and are tilted with respect to a horizontal plane 70 about a guide angle 73, as shown in FIG. 9.

The strand 45 will normally move in a downward direction, as indicated by the arrow 75 in FIG. 5, and has at its lower end, due to the high surface tension of the molten glass, a rounded portion 77.

FIG. 6, showing the cutting element 25 in cross-section, indicates the clearance angle 79 between a horizontal plane 70 and the clearance face 35, as well as the pressure angle 80 between the pressure face 37 and a vertical plane 81. FIG. 6A illustrates a connecting face 82 having two face portions normal to each other and extending between the end edges 83 and 84 of the clearance face 35 and the pressure face 37.

FIGS. 7-9 illustrate the two cutting elements 25 and 55 during further movement of the same towards each other as the cutting process proceeds in which the end cutting points 43 and 60 are already closely adjacent to each other so that the cutting process is nearly finished. The engaging points 67 and 68 move, as the cutting process proceeds closer to each other to finally coincide at the end cutting points 43 and 60.

FIG. 9 illustrates that the end cutting points 43 and 60, due to the guide angle 73, have a vertical distance 85 from each other, until the moment at which the last fiber of the strand 45 is separated. This guide angle 73 will also entail that the cutting edge 59 will move upwardly on the cutting edge 39 during the cutting process, while the cutting edge 39 will move downwardly on the cutting edge 59. In this way an exactly defined contact of the two cutting edges 39 and 59 and therewith a perfect cut is obtained.

The shear blade 20 shown in FIGS. 10-12 cooperates with a corresponding shear blade 90, only partially shown in FIG. 11. The shear blade 20 is connected by means of a connecting member 93 with a shaft 95, which is mounted in sleeve bearings 97 and 98 in a housing 100 tiltable about its longitudinal axis and shiftable also in axial direction. The axial shifting of the shaft 95 is performed by an adjusting screw 103 which is screwed into a threaded bore provided in an end wall 105 of the housing 100 and the adjusted position of which is secured by a counted nut 107. The shaft 95 is, as shown in FIG. 10, freely turnable relative to the adjusting screw 103 but axially immovably connected thereto by a pair of pins 109 driven into the shaft 95 and located with portions thereof in an annular groove 110 in the region of the end of the adjusting screw 103.

A yoke 113, extending transverse to the longitudinal axis of the shaft 95 to opposite sides of the latter, is fixedly connected to the shaft and abuts at opposite ends thereof against resiliently mounted pins 115 and 116. Each of these pins has, as shown in FIG. 11 for the pin 115, a head 118 and a shaft 119 which are guided in a spring element 122 connected with a bottom plate 120 of the housing 100. The head 118 abuts against a spring collar 123 of the spring element 122.

If the shaft 95 is tilted about its longitudinal axis, one of the pins 115 and 116, for instance the pin 115 together with its spring collar 123, will be pressed downwardly against the force of a spring 125 of the corresponding spring element 122. The pin 115 will therefore tend to move the shaft 95 again back to its normal position as shown in FIGS. 10-12.

The bottom plate 120 together with the remainder of the housing 100 is transversely movable along guide rails 128 and 129 of a shear blade holder 130. Such a transverse movement is accomplished by means of an adjusting screw 133 which is turnably mounted in an axially fixed position in a projection 135 of the shear blade holder 130 and which is threadingly engaged into a threaded bore provided in a side wall 137 of the housing 100. The shear blade holder 130 is provided with an elongated opening 139 through which a clamping screw 140 extends, which is threadingly engaged into a threaded bore provided in its bottom plate 120. The housing 100 may thus be secured by the clamping screw 140 in any transversely adjusted position produced by the adjusting screw 133.

The shear blade holder 130 is provided with a connecting fork 143 by means of which the shear blade holder may be connected to an arm, not shown in the drawing, and of known construction.

FIGS. 13 - 16 illustrate the mounting of the shear blade 90.

As shown in FIG. 13, the shear blade 90 is connected at one end to a shaft 150 extending transverse to the longitudinal axis of the shear blade and being tiltably mounted in a mounting member 148. The mounting member 148 carries, spaced from the longitudinal axis of the shaft 150, a fixed abutment pin 153 and, to opposite sides of the longitudinal axis of the shear blade 90, resiliently mounted pins 155 and 156 respectively supported by spring elements 158 and 159. Therefore, if, as shown in FIG. 11, the shear blade 90 comes in cutting contact with the shear blade 20, the shear blade 90 may yield downwardly in the direction of the arrow 160 shown in FIG. 13 against the force of the springs of the spring elements 158 and 159 so that a symmetrical contact with a predetermined pressure force will occur at the cutting edges of the shear blades 20 and 90.

A locking lever 165 is tiltably mounted on a transverse pin 163 in the mounting member 148 so that after operation of the locking lever 165 the shear blade 90 may be easily and quickly exchanged against another shear blade.

The mounting member 148 is mounted on an intermediate member 170 movable in horizontal direction. Such a movement may be produced by an adjusting screw 173 which is turnable but axially immovably mounted in an eye 175 of the intermediate member 170 and which is screwed into a threaded bore in an extension 177 of the mounting member 148. The mounting member 148 may be fixed, in any adjusted position relative to the intermediate member 170, by means of a clamping screw 180 which extends through an elongated opening 181 in the intermediate member 170 and is screwed into a corresponding threaded bore in the mounting member 148.

An adjusting screw 185 is turnably, but axially immovably, mounted in an extension 183 of the intermediate member 170. The adjusting screw 185 extends through an elongated opening 187 in a shear blade holder 190 and is screwed into a threaded bore of a member 193. During turning of the adjusting screw 185, the intermediate member 170 is moved along guides 195 and 196 (FIG. 14) of the member 193 upwardly or downwardly. The desired end position of the intermediate member 170 may be secured by a non-illustrated clamping screw.

A further adjusting screw 200 is turnably and axially immovably mounted in an extension 198 of a shear blade holder 190. The adjusting screw 200 is screwed into a threaded bore 201 of the member 193 so that the latter, by turning of the adjusting screw 200, may be adjusted in the direction of the longitudinal axis of the shear blade 90 and be fixed in any adjusted position by a non-illustrated clamping screw.

The shear blade holder 190 is securable, in a manner known per se, by means of a connecting fork 203 to a non-illustrated arm. As described above, the shear blade 90 may be adjusted relative to the connecting fork 203 along three coordinates which are normal to each other.

It is to be understood that the shear blade 90 is provided, in a manner similar as the shear blade 20, with a cutting element 205 and a carrying frame 207, as shown in FIG. 14.

It will be understood that each of the elements described above, or two or more together, may also find a useful application in other types of shearing device for strands of plastic material differing from the types described above.

While the invention has been illustrated and described as embodied in a shearing device for a strand of plastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a device for shearing gobs from at least one strand of plastic material, such as a strand of molten glass, a combination comprising two cooperating shear blades movable toward and away from each other, each of said shear blades comprising a frame, a cutting element fixedly connected to said frame and formed from material having a high heat penetration coefficient, high wear resistance, and good heat conductivity, each of said cutting elements having a cutting edge, a clearance face facing the other blade and including with a horizontal plane a clearance angle and which, starting from the cutting edge of one cutting element, extends away from the other blade, each of said cutting elements having, at the side opposite said clearance face, a pressure face including with a vertical plane a pressure angle and which, starting from the cutting edge of one cutting element, extends away from the other shear blade.

2. A combination as defined in claim 1, wherein said clearance angle is between 0° and 5°.

3. A combination as defined in claim 1, wherein said pressure angle is between 0° and 70°.

4. A combination as defined in claim 1, wherein each of said cutting elements is formed from hard metal.

5. A combination as defined in claim 1, wherein each of said cutting edges has a substantially V-shaped configuration and an end cutting point at the apex of the V, and wherein the cutting edge of at least one cutting element includes with a horizontal plane a guide angle such that the cutting edge of said one element extends, starting from said end cutting point thereof, away from the cutting edge of the other cutting element.

6. A combination as defined in claim 5, wherein said guide angle is between 0° and 2°.

7. A combination as defined in claim 1, wherein each of said cutting elements has a triangular cross-section.

8. A combination as defined in claim 1, wherein said clearance face and said pressure face are connected, opposite said cutting edge, by a profiled connecting face.

9. A combination as defined in claim 1, wherein at least a portion of each frame bordering the cutting element consists of a material having a high heat penetration coefficient and a good heat conductivity.

10. A combination as defined in claim 9, wherein said cutting element and said frame are connected by a layer of soldering material having a high heat penetration coefficient and a good heat conductivity.

11. A combination as defined in claim 10, wherein said layer of soldering material consists of hard silver solder.

12. A combination as defined in claim 1, wherein the thickness of the frame is at least equal to the maximum thickness of the cutting element connected thereto, and wherein the frame consists of a material having a high heat penetration coefficient and a good heat conductivity.

13. A combination as defined in claim 1, wherein each of said shear blades has a longitudinal axis and extends substantially in one plane, and wherein one of said shear blades is tiltable about its longitudinal axis and the other shear blade is tiltable about an axis which is parallel to its plane and which includes a right angle with the longitudinal axis thereof.

14. A combination as defined in claim 13, and including a housing coordinated with said one shear blade, a shaft connected to said one blade, said shaft extending in the direction of the longitudinal axis of said one blade and being turnably mounted in said housing, a yoke fixed to said shaft extending transverse to the shaft axis to opposite sides of the shaft, and resilient abutting means between said housing and opposite ends of said yoke.

15. A combination as defined in claim 14, wherein said shaft is also axially movable in said housing and including means for adjusting the axial position of said shaft relative to said housing.

16. A combination as defined in claim 14, and including a shear blade holder mounting said housing movable in a direction transverse to the axis of said shaft, and means for adjusting the position of said housing in said transverse direction relative to said shear blade holder.

17. A combination as defined in claim 13, and including a mounting member for the other shear blade, a shaft connected to said other shear blade, said shaft extending transverse to the longitudinal axis of said other blade, and being turnably mounted in said mounting member, and resilient abutting means between said mounting member and said other blade.

18. A combination as defined in claim 17, and including a further shear blade holder for said other blade, and means between said further shear blade holder and said mounting member for adjusting the position of said mounting member relative to said further shear blade holder three dimensionally in three directions normal to each other.

19. In a device for shearing gobs from at least one strand of plastic material, such as molten glass, a combination comprising, two cooperating shear blades movable toward and away from each other, each of said shear blades extending substantially in one plane and having a longitudinal axis, one of said shear blades being tiltable about its longitudinal axis, and the other of said shear blades being tiltable about an axis which is parallel to the plane of said other shear blade and which includes a right angle with the longitudinal axis of said other shear blade; a housing coordinated with said one shear blade; a shaft connected to said one shear blade, said shaft extending in the direction of the longitudinal axis of said one shear blade, and being turnably mounted in said housing; a yoke fixed to said shaft and extending transverse to the shaft axis to opposite sides of said shaft; and resilient abutting means between said housing and opposite ends of said yoke.

20. A combination as defined in claim 19, wherein said shaft is also axially movable in said housing, and including means for adjusting the axial position of said shaft relative to said housing.

21. A combination as defined in claim 19, and including a shear blade holder mounting said housing movable in a direction transverse to the axis of said shaft, and means for adjusting the position of said housing in said transverse direction relative to said shear blade holder.

22. In a device for shearing gobs from at least one strand of plastic material, such as molten glass, a combination, comprising two cooperating shear blades movable toward and away from each other, each of said shear blades extending substantially in one plane and having a longitudinal axis, one of said shear blades being tiltable about its longitudinal axis, and the other of said shear blades being tiltable about an axis which is parallel to the plane of said other shear blade and which includes a right angle with the longitudinal axis of said other shear blade; a mounting member for said other shear blade; a shaft connected to said other shear blade, said shaft extending transverse to the longitudinal axis of said other shear blade and being turnably mounted in said mounting member; resilient abutting means between said mounting member and said other shear blade; a further shear blade holder for said other shear blade; and means between said further shear blade holder and said mounting member for adjusting the position of said mounting member relative to said further shear blade holder three dimensionally in three directions normal to each other.

* * * * *